United States Patent Office 3,424,600
Patented Jan. 28, 1969

---

3,424,600
LIQUID MIXES FOR FOUNDRY CORES AND MOULDS AND METHOD OF MANUFACTURING FOUNDRY CORES AND MOULDS FROM SAME
Abram Moiseevich Liass, ulitsa Karla Marxa 7, Apt. 8, and Pavel Afanasievich Borsook, Nijhnjaja Pervomaiskaja ulitsa 59, Apt. 13, both of Moscow, U.S.S.R.
No Drawing. Continuation-in-part of application Ser. No. 243,967, Nov. 26, 1962. This application May 26, 1965, Ser. No. 459,090
U.S. Cl. 106—38.35             10 Claims
Int. Cl. C04b 25/06; B28b 7/34

ABSTRACT OF THE DISCLOSURE

This invention relates to a fluid self-hardening mixture for making foundry cores and molds containing a filler (silica sand, olivine sand, etc.); a binder which is an aqueous solution of sodium silicate (having a $SiO_2$ to $Na_2O$ ratio of about 2 to 3); bicalcium silicate to promote self-hardening; and 0.05–0.4 part by weight of neutralized sulfonic acid. The binder may be synthetic urea formaldehydefurfurol resin and an aqueous solution of oxalic acid as a catalyst.

---

This is a continuation-in-part of application Ser. No. 243,967, filed Nov. 26, 1962, now abandoned.

This invention relates to foundry practice and more particularly to mixtures for making foundry cores and molds.

Most currently used at present are sand mixtures for foundry molds and cores which require compacting in core boxes or on patterns. In many cases these processes are mechanized, but in shops where individual items are produced or small-scale production is effected the cores (and in some shops also molds) are made manually. Cores and molds produced are subjected to drying in furnaces or blowing with carbon dioxide ($CO_2$).

The total amount of labour required for making cores and molds from said mixtures reaches about 30 to 50 percent of the total amount of labour for manufacturing castings.

It is known to make molds and cores of a fluid mixture containing ethyl silicate as a binder. Such mixtures, however, require a prolonged calcining at 800–1000° C. or burning out of the binder, wherefore they have but a limited application. The latter factor results in a very high cost of such mixtures resulting from the use of expensive ethyl silicate as a component of the mixture.

Proposed herein is a fluid self-hardening mixture containing a filler (e.g. silica sand, olivine sand, chromomagnesite and the like), a binder which is an aqueous solution of sodium silicate (liquid glass) having a $SiO_2$ to $Na_2O$ ratio of about 2 to 3, into which, for bringing the mixture into the liquid state at a low total moisture content (about up to 5–6 percent) foaming surface active agents are introduced in the form of petroleum sulfonic acids neutralized e.g. with caustic soda.

As foaming agents various sulfosalts may also be used which are obtained by sulfonating or sulfiting the products of processing oil or slate by any conventional methods.

When choosing foaming agents from among sulfosalts it should be borne in mind that the sulfosalt is not to react with the binder and thus decompose it.

The final stage of the sulfiting process is a subsequent neutralization of the surface-active agents, preferably with the help of soduim hydrate or soda.

Among sulfosalts thus obtained there may be mentioned soda salts of alkyl benzenesulfontaes, alkyl naphthalenesulfonates, alkyl sulfonates, primary and secondary alkyl sulfates.

The trade names of some sulfosalts belonging to the products enumerated above are as follows: sulfonol, DC–PAC (Soviet detergent—soluble alkylaryl sulfonate), alkanol, acidol, ultravet, mesolate, etc.

Sulfosalts serving as foaming agents are introduced into the mixture in amounts about 0.05 to 0.4 percent by weight of the mixture. Given below are two examples of the mixture with the above-cited foaming agents.

Example 1.—Approximate composition of the mixture

| | Parts by weight |
|---|---|
| (1) Filler (such as silica sand etc.) | 90–98 |
| (2) Binder (aqueous solution of sodium silicate, ratio 2.0–3.0; specific gravity 1.44–1.52) | 4–7 |
| (3) Additive to promote self-hardening of the mixture | 2–10 |
| (4) Foaming agent (neutralized sulfonic acid; sulfosalt, e.g. DC–PAC, sulfonated oil etc.) | 0.05–0.4 |
| (5) Water | 1.0–3.0 |

Example 2.—Preferable composition of the mixture

| | Parts by weight |
|---|---|
| (1) Filler (such as silica sand etc.) | 95 |
| (2) Binder (aqueous solution of sodium silicate, ratio 2.7–3.0, specific gravity 1.48–1.50) | 6 |
| (3) Additive to promote self-hardening of the mixture | 5 |
| (4) Foaming agent (neutralized sulfonic acid) | 0.2–0.4 |
| (5) Water | 1.5–2.0 |

When preparing a fluid self-hardening mixture, in addition to the binder, aqueous solution of sodium silicate and foaming agent which transfers the mixture, while stirring, into the liquid state, there is introduced an additive, which promotes self-hardening of cores and molds in the air, said additive being bicalcium silicate ($2CaO \cdot SiO_2$). Said bicalcium silicate may be used in the form of highly basic metallurgical slag with the CaO to $SiO_2$ ratio being within 1.5–3.0. As such, self-disintegrating slags, being the by-products of the ferrochromium production or the blast furnace operation, should preferably be used.

Bicalcium silicate may also be used in the form of nepheline slime which is a by-product when producing alumina from nepheline ores. The approximate composition of the mixture with slag is given below:

Example 3

| | Parts by weight |
|---|---|
| (1) Filler (silica sand etc.) | 90–98 |
| (2) Binder (aqueous solution of sodium silicate, ratio 2.0–3.0; specific gravity 1.44–1.52) | 4–7 |
| (3) Additive promoting self-hardening of the mixture (ferro-chromium disintegrating slag etc.) | 2–10 |
| (4) Foaming agent (neutralized sulfonic acid, sulfosalts, e.g. DC–PAC, sulfonated oil, etc.) | 0.05–0.4 |
| (5) Water | 1.0–3.0 |

The preferable composition of the mixture with slag is given in Example 4.

Example 4

| | Parts by weight |
|---|---|
| (1) Filler (silica sand) | 95 |
| (2) Binder (aqueous solution of sodium silicate; modulus 2.7–3.0, specific gravity 1.48–1.50) | 6 |
| (3) Additive promoting self-hardening of the mixture (ferro-chromium self-disintegrating slag) | 5 |

Example 3.—Continued

| | Parts by weight |
|---|---|
| (4) Foaming agent (sulfosalt, e.g. DC–PAC, sulfonated oil, etc.) | 0.1 |
| (5) Water | 1.5–2.0 |

An approximate composition of the mixture with slime is given in Example 5.

Example 5

| | Parts by weight |
|---|---|
| (1) Filler (silica sand) | 90–98 |
| (2) Binder (aqueous solution of sodium silicate; modulus 2.0–3.0, specific gravity 1.44–1.52) | 4–7 |
| (3) Additive promoting self-hardening of the mixture (nepheline slime) | 2–10 |
| (4) Foaming agent (neutralized sulfonic acid, sulfosalt, e.g. DC–PAC, sulfonated oil) | 0.05–0.4 |
| (5) Water | 1.0–3.0 |

The preferable composition of the mixture.

Example 6

| | Parts by weight |
|---|---|
| (1) Filler (slica sand) | 94 |
| (2) Binder (aqueous solution of sodium silicate; ratio 2.7–3.0; specific gravity 1.48–1.50) | 6 |
| (3) Additive to promote self-hardening of the mixture (nepheline slime) | 6 |
| (4) Foaming agent (sulfosalt, e.g. DC–PAC, sulfonated oil, etc.) | 0.1 |
| (5) Water | 1.5–2.0 |

The process of self-hardening of the mixtures described above is due to exchange reactions between the binding aqueous solution of sodium silicate and said additives with the formation of calcium hydrosilicates, as well as due to the dehydration of liquid glass resulting from the hydration of the additive.

The mixture containing a filler, a binder, which is an aqueous solution of sodium silicate, a foaming agent and a highly basic slag (e.g. ferrochromium one) or nepheline slime to promote self-hardening takes as much as 40 to 50 minutes for hardening.

To provide a sharp acceleration of the hardening process gypsum may be introduced into the mixture, preferably in the form of insoluble anhydride ($CaSO_4$).

The time of solidification of such mixture may be made as short as 3 to 4 min.

To control the rate of hardening of such mixtures within a wide range, hardening decelerating agents may be additionally introduced therein, such as borax $$Na_2B_4O_7 \cdot 10H_2O$$

or phosphates or borates of alkaline metals and the like.

The preferable compositions of such mixtures are given in Examples 7 and 8.

Example 7

The mixture prepared in accordance with Examples 3, 4, 5 and 6, whereinto, in order to accelerate its hardening in the air, there is introduced gypsum in the form of insoluble anhydrite taken in an amount about 0.5–2 percent.

Example 8

The mixture prepared in accordance with Examples 3, 4, 5, 6 and 7, whereinto, in order to decelerate its hardening there is introduced borax taken in the amount of about 0.01–0.1 percent by the weight of the mixture as an aqueous solution.

The time of hardening of cores and molds manufactured of fluid mixtures and their strength may be regulated by varying the amount of the binder in the mixture, by varying the modulus of said binder as well as the amount and granulometric structure of the additive which promotes self-hardening of cores and molds.

The time of hardening of cores and molds irrespective of their sizes is, as a rule, not greater than 40 to 50 minutes.

Depending on the manufacturing condition a necessity may arise to vary the time during which the mixture is in the liquid state.

An increase in the time during which the mixture remains in the liquid state (i.e. an increase in the foam stability) can be achieved by introducing into the mixture containing a filler, a binder, a foaming agent and an additive promoting self-hardening of the mixture in air, foam stabilizers in an amount of 0.01–0.2 percent, such as sodium soap of water-insoluble organic acids separated from the wastes of alkaline purification of kerosene, gas-oil and solar oil distillates. Any other foaming agents ensuring stable foam can be used as foam stabilizers.

To reduce the stability of foam, it is possible to use e.g. kerosene, which is to be introduced into the mixture in the amount of 1–5 percent by weight of the foaming agent preliminarily introduced thereinto.

The preferable compositions of mixtures are given in Examples 9 and 10.

Example 9

| | Parts by weight |
|---|---|
| (1) Filler (silica sand) | 95 |
| (2) Binder (aqueous solution of sodium silicate, ratio 2.7–3.0, specific gravity 1.48–1.50) | 6 |
| (3) Additive promoting self-hardening of the mixture (ferro-chromium self-disintegrating slag) | 5 |
| (4) Foaming agent (neutralized sulfonic acid) | 0.4 |
| (5) Foam stabilizer (sodium soap of water-insoluble organic acids) | 0–.01 |
| (6) Water | 1.5–2 |

Example 10

| | Parts by weight |
|---|---|
| (1) Filler (silica sand) | 95 |
| (2) Binder (aqueous solution of sodium silicate, ratio 2.7–3.0, specific gravity 1.48–1.50) | 6 |
| (3) Additive to promote self-hardening of the mixture (ferro-chromium self-disintegrating slag) | 5 |
| (4) Foaming agent (sulfosalt DC–PAC) | 0.1 |
| (5) Additive, reducing the foam stability (kerosene), 0–.5 percent by weight of the foaming agent. | |
| (6) Water | 1.5–2.0 |

In order to facilitate knocking out of mixtures containing a filler, a binder (aqueous solution of sodium silicate), a foaming agent and a substance promoting self-hardening of cores and molds in air, organic additives (such as graphite, coal, coke, pitch, sawdust and the like) are introduced into the composition of said mixtures.

An approximate composition of the mixture is given in Example 11.

Example 11

| | Parts by weight |
|---|---|
| (1) Filler (silica sand etc.) | 86–97.5 |
| (2) Binder (aqueous solution of sodium silicate) | 4–7 |
| (3) Additive promoting self-hardening (slag) | 2–10 |
| (4) Foaming agent (sulfosalt, e.g. sulfonated oil DC–PAC etc.) | 0.05–0.2 |
| (5) Organic additive, facilitating knocking out (coal or coke dust, or graphite, or pitch, or sawdust etc.) | 0.5–4 |
| (6) Water | 1.25–30 |

The preferable composition of the mixture is given in Example 12.

Example 12

| | Parts by weight |
|---|---|
| (1) Filler (silica sand etc.) | 92–93 |
| (2) Binder (aqueous solution of sodium silicate, ratio 2.7–3.0, specific gravity 1.48–1.50) | 6 |
| (3) Additive promoting self-hardening of the mixture (ferro-chromium self-disintegrating slag) | 5 |

Example 12.—Continued Parts by weight
(4) Foaming agent (sulfosalt, e.g. sulfonated oil, DC-PAC etc.) — 0.1
(5) Organic additive facilitating knocking out (e.g. coke dust) — 2–3
(6) Water — 1.5–2.0

Fluid mixtures may also contain a filler, a foaming agent and an organic binder. The organic binders may be synthetic resins, such as urea formaldehyde-furfurol resins.

In this case the additive promoting solidification of the mixture in air may be catalysts, such as oxalic acid, and the like.

To prepare fluid self-hardening mixtures other synthetic resins may also be used, e.g. furan, phenol-formaldehyde-furfurol resins, etc.

Depending on the type of resin, adequate additives-catalysts can be selected.

The preferable composition of the mixture is given in Example 13.

Example 13

Parts by weight
(1) Filler (silica sand etc.) — 100
(2) Binder (urea formaldehyde-furfurol resin) — 3.5
(3) Foaming agent (sulfosalt, e.g. DC-PAC, sulfonated oil etc.) — 0.2
(4) Additive promoting self-hardening of the mixture (catalyst, 10 percent solution of oxalic acid) — 0.6
(5) Water — 2

The mixture prepared in accordance with Example 13 differs from those known wherein synthetic resins are used as binders in that cores and molds are made by means of pouring the mixture into core boxes or onto patterns.

The method of making foundry cores and molds from fluid mixtures consists essentially in that in a mixer, preferably of a blade type, first dry components are mixed, viz. 90–98 parts by weight of sand as a filler and 2–10 parts by weight of bicalcium silicate in the form of highly basic metallurgical slag or nepheline slime, whereup to said mixture of dry components there is added a liquid composition comprising a binder, viz. an aqueous solution of sodium silicate in the amount of 4–7 parts by weight, 0.05–0.4 part by weight of sulfosalts as a foaming surface-active agent and 1–3 parts by weight of water; the mixture thus obtained is vigorously stirred till it passes into the liquid state, and then it is poured into core boxes or onto patterns, where said mixture solidifies during a predetermined period of time.

Though the above described method of preparing the mixture is the preferred one, the order of introducing the components may be varied; thus first sand is introduced into the mixer, then the liquid composition, and, finally, the additive to promote self-hardening of the mixture, i.e. slag or slime.

The liquid composition may either be prepared in advance and then introduced into the mixer, or each component of said liquid composition may be introduced in the mixer separately.

After the solidification of cores they are removed from core boxes and can be delivered for pouring the metal thereinto.

Cores and molds prepared by means of the above-described method require no thermal drying.

When making cores and molds the fluid mixture is poured into core boxes or onto patterns directly from the mixer or from ladles in which said mixture is transported from the mixer to the place of pouring.

The pouring of the mixture into core boxes or onto patterns may be effected:

(a) by pouring one mix or the mixture from one ladle into one or several core boxes or onto patterns;
(b) by a successive batch pouring of the mixture into the same core box or onto a pattern in case of cores or patterns being big in size;
(c) by continuously feeding the mixture into a core box or onto a pattern.

Cores and molds from fluid self-hardening mixtures may be made with subjecting the core boxes or patterns to vibration.

The use of vibration makes it possible to produce cores of complicated configurations, and also to considerably increase the strength of cores and molds being made.

What is claimed is:

1. Fluid self-hardening mixtures for making foundry cores and molds comprising: 90–98 parts by weight of molding sand as a filler; 4–7 parts by weight of an aqueous solution of sodium silicate used as a binder, the $SiO_2$ to $Na_2O$ ratio being from 2 to 3, the specific gravity being from 1.44 to 1.52; 2–10 parts by weight of biacalcium silicate to promote self-hardening of the mixture; 0.05–0.4 part by weight of neutralized sulphonic acid as a foaming surface-active agent; and 1–3 parts by weight of water.

2. Fluid self-hardening mixtures for making foundry cores and molds comprising: 90–98 parts by weight of molding sand as a filler; 4–7 parts by weight of an aqueous solution of sodium silicate used as a binder, the $SiO_2$ to $Na_2O$ ratio being from 2 to 3, the specific gravity being from 1.44 to 1.52; 2–10 parts by weight of bicalcium silicate in the form of a highly basic metallurgical slag, the CaO to $SiO_2$ ratio being from 1.5 to 3, to promote self-hardening of the mixture; 0.05–0.4 part by weight of neutralized sulphonic acid used as a foaming surface-active agent; and 1–3 parts by weight of water.

3. Fluid self-hardening mixtures for making foundry cores and molds comprising: 90–98 parts by weight of molding sand as a filler; 4–7 parts by weight of an aqueous solution of sodium silicate used as a binder, the $SiO_2$ to $Na_2O$ ratio being from 2 to 3, the specific gravity being from 1.44 to 1.52; 2–10 parts by weight of bicalcium silicate in the form of a highly basic metallurgical slag, the CaO to $SiO_2$ ratio being from 1.5 to 3, to promote self-hardening of the mixture; 0.05–0.4 part by weight of sulfocompounds selected from the group of alkylaryl sulfonates alkyl sulfonates and alkyl sulfates used as a foaming surface-active agent; and 1–3 parts by weight of water.

4. Fluid self-hardening mixtures for making foundry cores and molds comprising: 86–97.5 parts by weight of molding sand as a filler; 4–7 parts by weight of an aqueous solution of sodium silicate used as a binder, the $SiO_2$ to $Na_2O$ ratio being from 2 to 3, the specific gravity being 1.44 to 1.52; 2–10 parts by weight of bicalcium silicate in the form of a highly basic metallurgical slag, the CaO to $SiO_2$ ratio being from 1.5 to 3, to promote self-hardening of the mixture; 0.05–0.4 part by weight of sulfocompounds selected from the group of alkylaryl sulfonates alkyl sulfonates and alkyl sulfates used as a foaming surface-active agent; 0.5–4.0 parts by weight of a carbonoceous additive, which does not react with the aqueous solution of sodium silicate and is used to facilitate knocking-out of cores from castings; and 1–3 parts by weight of water.

5. Fluid self-hardening mixtures for making foundry cores and molds comprising: 90–98 parts by weight of molding sand as a filler; 4–7 parts by weight of an aqueous solution of sodium silicate used as a binder, the $SiO_2$ to $Na_2O$ ratio being from 2 to 3, the specific gravity being from 1.44 to 1.52; 2–7 parts by weight of bicalcium silicate in the form of a highly basic metallurgical slag, the CaO to $SiO_2$ ratio being from 1.5 to 3, to promote self-hardening of the mixture; 0.05–0.4 part by weight of sulfocompounds selected from the group of alkylaryl sulfonates alkyl sulfonates and alkyl sulfates used as a foaming surface-active agent; 0.5–2.0 parts by weight of anhydrous calcium sulphate, to accelerate self-hardening of the mixture in air; and 1–3 parts by weight of water.

6. Fluid self-hardening mixtures for making foundry cores and molds comprising: 90–98 parts by weight of molding sand as a filler; 4–7 parts by weight of an aqueous solution of sodium silicate used as a binder, the $SiO_2$ to $Na_2O$ ratio being from 2 to 3, the specific gravity being 1.44 to 1.52; 2–10 parts by weight of bicalcium silicate in the form of a highly basic metallurgical slag, the CaO to $SiO_2$ ratio being from 1.5 to 3, to promote self-hardening of the mixture; 0.05–0.4 part by weight of sulfocompounds selected from the group of alkylaryl sulfonates; alkyl sulfonates and alkyl sulfates used as a foaming surface-active agent; 0.5–2.0 parts by weight of anhydrous calcium sulphate to accelerate air self-hardening of the mixture; 0.01–0.1 part by weight of borax in an aqueous solution to control the time of self-hardening of the mixture; and 1–3 parts by weight of water.

7. Fluid self-hardening mixtures for making foundry cores and molds comprising: 90–98 parts by weight of molding sand as a filler; 4–7 parts by weight of an aqueous solution of sodium silicate used as a binder, the $SiO_2$ to $Na_2O$ ratio being from 2 to 3, the specific gravity being 1.44 to 1.52; 2–10 parts by weight of bicalcium silicate in the form of a highly basic metallurgical slag, the CaO to $SiO_2$ ratio being from 1.5 to 3, to promote self-hardening of the mixture; 0.05–0.4 part by weight of sulfocompounds selected from the group of alkylaryl sulfonates, alkyl sulfonates and alkyl sulfates used as a foaming surface-active agent; 0.01–0.2 part by weight of sodium soap of water-insoluble petroleum acids derived by alkaline refining of kerosene, gas oil and solar oil distillates of petroleum used as a foam stabilizer to prolong the time during which the mixture is in the liquid state; and 1–3 parts by weight of water.

8. Fluid self-hardening mixtures for making foundry cores and molds comprising: 90–98 parts by weight of molding sand as a filler; 4–7 parts by weight of an aqueous solution of sodium silicate used as a binder, the $SiO_2$ to $Na_2O$ ratio being from 2 to 3, the specific gravity being from 1.44 to 1.52; 2–10 parts by weight of bicalcium silicate in the form of a highly basic metallurgical slag, the CaO to $SiO_2$ ratio being from 1.5 to 3, to promote self-hardening of the mixture; 0.05–0.4 part by weight of sulfocompounds selected from the group of alkylaryl sulfonates, alkyl sulfonates and alkyl sulfates used as a foaming surface-active agent; 1–5 percent by weight of kerosene with respect to the weight of said surface-active agent for reducing the time of the mixture being in the liquid state.

9. Fluid self-hardening mixtures for making foundry cores and molds comprising 90–98 parts by weight of molding sand as a filler; 4–7 parts by weight of an aqueous solution of sodium silicate used as a binder, the $SiO_2$ to $Na_2O$ ratio being from 2 to 3, the specific gravity being 1.44 to 1.52; 2–10 parts by weight of bicalcium silicate in the form of nepheline slime, the CaO to $SiO_2$ ratio being 1.8–2.2, to promote self-hardening of the mixture; 0.05–0.4 part by weight of sulfocompounds selected from the group of alkylaryl sulfonates, alkyl sulfonates and alkyl sulfates used as a foaming surface-active agent; and 1–3 parts by weight of water.

10. A method of making foundry cores and molds from fluid self-hardening mixtures, according to which first dry components, namely, 90–98 parts by weight of molding sand used as a filler and 2–10 parts by weight of bicalcium silicate are mixed; then a liquid composition is added to said mixture, said liquid composition comprising 4–7 parts by weight of an aqueous solution of sodium silicate used as a binder, 0.05–0.4 part by weight of sulfocompounds selected from the group of alkylaryl sulfonates, alkyl sulfonates and alkyl sulfates used as a foaming surface-active agent, and 1–3 parts by weight of water; whereupon the mixture thus obtained is vigorously stirred till it passes into the liquid state, after which said fluid mixture is utilized in making said cores and molds where it undergoes self-hardening in air during a preset period of time.

References Cited

UNITED STATES PATENTS

| | | | |
|---|---|---|---|
| 1,077,958 | 11/1913 | Gleason | 106—38.3 |
| 2,752,257 | 6/1956 | Bradley et al. | 22—193 X |
| 2,888,354 | 5/1959 | Smith et al. | 106—38.35 X |
| 2,975,494 | 3/1961 | Cooper | 106—38.35 X |
| 3,202,522 | 8/1965 | Yang et al. | 106—117 X |
| 3,247,556 | 4/1966 | Buell et al. | 22—193 |
| 3,232,777 | 2/1966 | Bush | 106—90 |

FOREIGN PATENTS 953,954  4/1964  Great Britain.

JULIUS FROME, *Primary Examiner.*

L. HAYES, *Assistant Examiner.*

U.S. Cl. X.R.

106—38.3, 38.9, 74